Oct. 13, 1959 K. A. RIEDEL 2,908,204
KNEE DEFLECTION ELIMINATOR
Filed Nov. 12, 1957 2 Sheets-Sheet 1
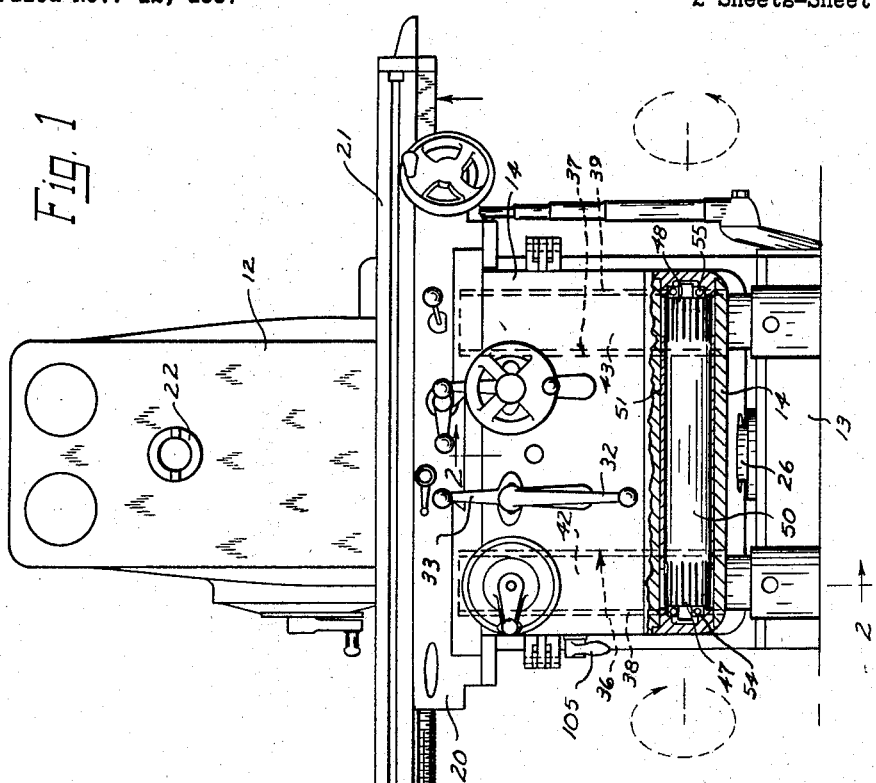
Fig. 1
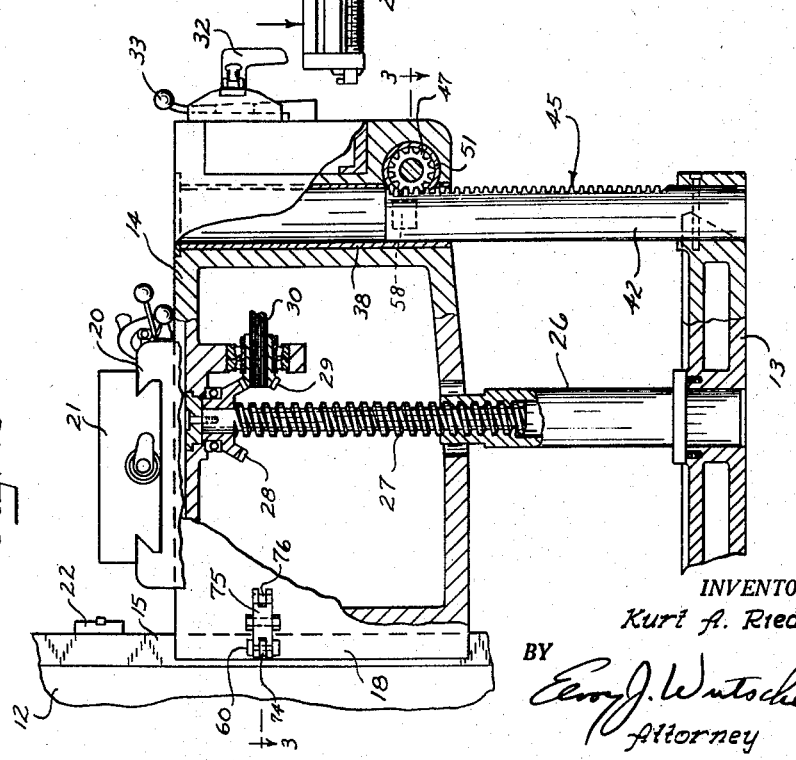
Fig. 2
INVENTOR.
Kurt A. Riedel
BY
Attorney

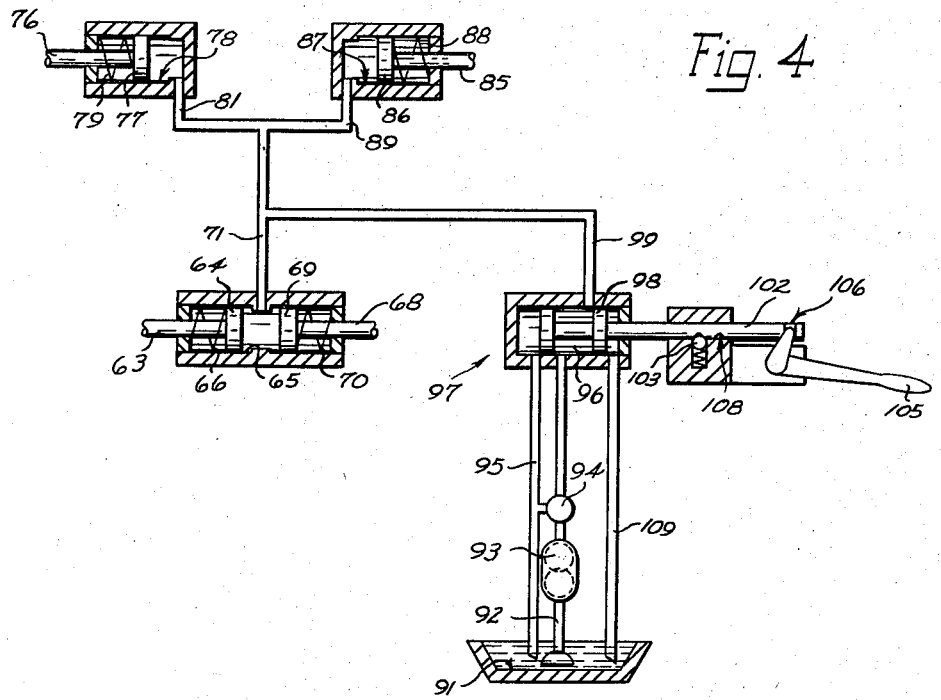

United States Patent Office 2,908,204
Patented Oct. 13, 1959

2,908,204

KNEE DEFLECTION ELIMINATOR

Kurt A. Riedel, Milwaukee, Wis., assignor to Kearney & Trecker Corporation, West Allis, Wis., a corporation of Wisconsin Application November 12, 1957, Serial No. 695,564

8 Claims. (Cl. 90—58)

This invention relates generally to improvements in machine tools and more particularly to an improved knee deflection eliminator and knee clamping mechanism for the vertically movable work supporting knee of a knee and column type milling machine.

In many prior knee type milling machines, it has been customary to provide a vertically upstanding column presenting spaced apart vertical front way surfaces disposed to guidably constrain cooperating way surfaces presented by the rear face of a vertically movable knee. To effect vertical adjustment of the knee along the column way surfaces, it has been customary to interpose a single power driven screw and nut elevating mechanism between the knee and the forwardly extending base of the column. This arrangement provides a three point support for the vertically movable knee, including the spaced apart way surfaces and the elevating screw mechanism. As is well known in the art, a saddle is slidably carried on the upward surface of the knee for movement toward and away from the front face of the column. In addition, a work supporting table is slidably mounted upon the upper surface of the saddle for longitudinal movement in a plane parallel to the front column face. Because both the saddle and table are movable relative to the principal knee support member, the distribution of weight varies in accordance with the adjusted position of these work supports. As the saddle and table are moved, lever actions are created tending to deflect the knee slightly from its normal vertical or perpendicular plane. Likewise, with a workpiece upon the worktable, the unbalanced condition is increased to further aggravate deflection of the knee from a vertical plane. As a consequence, the work supporting table itself is deflected slightly from its normal and desired horizontal plane, thereby creating certain slight inaccuracies in some machining operations. This inherent characteristic of unavoidable deflection in certain prior knee and column type milling machines has been well known for many years. Although deflection and resulting inaccuracies are extremely undesirable, the condition has not in the past been serious enough to preclude using knee and column type machines. The greater operationable flexibility that is likewise inherent in knee type milling machines seemed to offset the well known disadvantages, particularly of the lower speed and feed rates. Higher cutting speeds and feeds, together with the newer metal cutting techniques, however, have combined to preclude using knee type milling machines for certain operations, especially in cases requiring extreme accuracy.

The general object of this invention is to provide an improved work supporting structure in a knee type milling machine.

Another object of the invention is to provide a mechanism that will automatically resist various unbalanced load conditions in the work supporting members of a knee and column type milling machine.

Another object is to provide an automatically operative mechanism for eliminating deflection due to unbalanced load conditions in the work supports of a milling machine.

Another object is to provide a knee deflection eliminator that is operative to resist deflection from a vertical plane irrespective of the vertically adjusted position of a movable knee structure of a milling machine.

Another object is to provide an improved knee deflection eliminator disposed to coact with a clamp mechanism adapted to clamp a vertically movable knee structure in selected position at four spaced apart points.

Another object is to provide an improved self-equalizing clamping mechanism for the vertically movable knee structure of a milling machine.

Another object is to provide an improved anti-deflection mechanism in combination with a self-equalizing clamping mechanism, operable to resist knee deflection irrespective of whether the knee is being vertically adjusted or clamped in a predetermined position of vertical adjustment.

A further object of the invention is to provide in a knee and column type milling machine a deflection eliminator disposed to coact with the vertical column way surfaces and a single screw and nut elevating mechanism to provide additional stability and resistance to deflection of a vertically movable knee.

A still further object of the invention is to provide a knee deflection eliminator that is automatically operative to resist deflection and requires no external source of driving power.

According to this invention, an improved deflection eliminator is operatively incorporated in a knee and column type milling machine having the usual vertically upstanding column and forwardly projecting base integrally formed with the column. A vertically movable knee guidably constrained by way surfaces presented by the column is operatively connected with the forwardly projecting base by means of a selectively extensible single screw and nut translating mechanism. A transversely movable saddle slidably carried on the upper surface of the knee is disposed to, in turn, support a longitudinally movable worktable that is operatively positionable relative to a power driven tool spindle journalled in the upper portion of the column. The deflection eliminator comprises a pair of spaced apart vertical bars secured at their lower ends to the column base, and extending upwardly to engage two spaced apart circular bearings vertically formed within the forward portion of the knee. The stationary circular bars are provided toward their central upper sections with rack teeth disposed to operatively engage pinions that are in turn fixedly secured to a common rotatable shaft. The arrangement is such that as the translating mechanism operates to effect vertical knee movement, the rack teeth presented by the circular bars will effect simultaneous rotation of the pinions and shaft. Irrespective of whether the knee is being vertically moved or is stationary, the coaction between the rigid circular bars and the floating pinion shaft operates to resist knee deflection in either direction from a vertical plane. This is due to the fact that downward force upon one side of the knee results in a corresponding upward force on the opposite side of the knee, in effect exerting a twisting or torsional deflection force. Thus, downward movement of one side of the knee tends to rotate one of the pinions in a clockwise direction while, at the same time, upward knee movement toward the other side tends to effect counterclockwise rotation of the other pinion. Since the pinions are both secured to a common shaft, neither of the pinions will actually rotate. Thus, the operative interconnection between the pinions, common shaft, and circular rack bars effectively resists deflection of the knee in either direction from a vertical plane. To clamp the knee in vertically adjusted position, a hydraulically actuated self-equalizing clamp system is provided. The clamping mechanism comprises four separate hydraulically actuated clamps carried within the knee and disposed to exert clamping pressure upon the two circular rack bars as well as the spaced apart column way surfaces, thereby clamping the knee against movement at four spaced apart points.

The foregoing and other objects of the invention which will become more fully apparent from the following detailed description of mechanisms exemplifying preferred embodiments thereof, may be achieved by the apparatus described herein in connection with the accompanying drawings, in which:

Figure 1 is a view principally in front elevation of a knee and column type milling machine, parts of the machine having been broken away to show a portion of the internal mechanism;

Fig. 2 is an enlarged fragmentary view, partly in side elevation and partly in transverse vertical section including the knee end portions of the column taken generally along the lines 2—2 in Fig. 1;

Fig. 3 is a view in horizontal section through the knee structure and a portion of the column, taken generally along the lines 3—3 in Fig. 2; and, Fig. 4 is a schematic diagram of the hydraulic circuit for actuating the self-equalizing clamping mechanism.

While the apparatus shown in the drawings and disclosed as a deflection eliminator in a knee and column type milling machine is a preferred embodiment of the invention, it is to be understood that the various novel features of the invention may be used with equal advantage in other types of machine tools.

Referring now to Fig. 1 of the drawings, the invention is incorporated in a knee and column type milling machine provided with a vertically upstanding column 12 having an integrally formed forwardly projecting base 13. As shown in Figs. 1, 2 and 3, a vertically movable knee 14 is provided with spaced apart way surfaces disposed to engage complementary vertically formed dovetail ways 15 and 16 presented by the column 12. Although this arrangement is well known in the art, Figs. 2 and 3 illustrate rearwardly extending vertical projections 18 and 19 secured to the knee 14 and provided at their opposite inner edges with vertically disposed angular way surfaces adapted to engage the complementary column way surfaces.

A saddle 20 is slidably carried by the horizontal upper surface of the knee 14 for movement toward and away from the front face of the column 12, the saddle in turn supporting a longitudinally reciprocable work supporting table 21. Thus, a workpiece (not shown) may be secured to the upper surface of the worktable 21 in working proximity to a tool spindle 22 journalled in the column 12 that is connectable in well known manner to be driven by a motor (not shown).

To effect selective vertical adjustment of the knee 14, a vertically extending pedestal type nut 26 secured at its lower end to the column base 13 is engaged by a rotatable elevating screw 27 journalled at its upper end within the hollow knee 14. For rotating the screw 27 to effect vertical knee movement, a bevel gear 28 secured to the screw 27 is engaged by a complementary bevel gear 29 secured to the inner end of a rotatably journalled splined shaft 30. Vertical movement of the knee 14 may be effected either manually or by means of a power driven feed transmission (not shown). The arrangement is such that a hand crank 32 carried at the front of the knee 14, Fig. 1, may be clutched to a driven shaft (not shown) and rotated to in turn rotate the shaft 30 for effecting vertical knee movement. Likewise, a pivotable directional lever 33 is movable in either direction, from the central neutral position shown in Fig. 1, to engage the power feed transmission (not shown) for rotating the shaft 30 to move the knee vertically at a selected rate of travel. The structure and interconnected parts respectively responsive to the hand crank 32 and directional lever 33 is similar to that fully shown and described in U.S. Patent No. 2,497,842, which issued to Armitage et al. on February 14, 1950. This issued U.S. patent likewise shows and discloses both manual and power operable means for effecting selective transverse movement of the saddle 20 and longitudinal movement of the work supporting table 21.

As heretofore described, it will be apparent that the four principal members of the milling machine shown in Fig. 1, including the column 12, knee 14, saddle 20 and worktable 21 are operatively interconnected for the primary purpose of positioning and moving the worktable 21 relative to the tool spindle 22. This general structural arrangement of the major parts of a knee and column type milling machine has been known for many years, and the machines have been utilized most effectively because of the extreme flexibility in operating upon workpieces of various sizes. In such machines, it will be apparent that the principal support for the vertically movable knee 14, comprises the spaced apart column way 15 and 16, as well as the elevating mechanism comprising the coacting screw 27 and pedestal nut 26. This arrangement actually provides a three point support for the knee 14 including the two spaced apart column way surfaces 15 and 16, and the single elevating mechanism. It will be apparent that moving the worktable 21 longitudinally to either extreme end position from the position shown in Fig. 1, will impose varying degrees of unbalanced load conditions upon the knee 14. This condition is further exaggerated if the saddle 20 is moved to its extreme forward position from that shown in Fig. 2, and, simultaneously therewith, the worktable 21 is moved to one of its extreme end positions. With such a condition existing, it is obvious that the combined weight of the saddle 20 and worktable 21 will produce, in effect, a lever action that tends to deflect the knee 14 from its normal vertical condition. Such a torsional or twisting movement of the knee 14, in turn, permits slight deflection of the worktable 21 from its normal horizontal plane, thereby introducing slight inaccuracies in machining operations. Heretofore, such inaccuracies have not been of a magnitude that seriously interfered with utilizing knee type milling machines for many types of cutting operations because of the obvious advantages in operational flexibility.

With the advent of higher speeds and feeds, as well as improved cutting techniques, the unbalanced load conditions on the knee of a knee type milling machine have been correspondingly increased. These various factors have combined to increase the magnitude of deflection and, consequently, the inaccuracies from unavoidable deflection in a conventional single screw and nut knee type milling machine. Because of this, it has become increasingly important to minimize or obviate completely any tendency for the vertically movable work supporting knee of a milling machine to deflect slightly from its normal vertical plane.

To resist deflection of the vertically movable knee 14 in either direction from a vertical plane, the present invention provides a mechanism that is automatically operative irrespective of whether the knee is being moved vertically or is in a stationary selected position relative to the base 13. To effect this result, as shown in Figs. 1, 2 and 3, the knee 14 is provided with a pair of vertically spaced apart bored openings 36 and 37. Within the bored openings 36 and 37 are fixedly secured a pair of hardened bearing sleeves 38 and 39, respectively disposed to slidably engage a pair of vertical, circular support bars or shafts 42 and 43 rigidly secured at their lower ends to the column base 13. The slidable engagement of the circular support bars 42 and 43 within the cooperating knee bearing sleeves 38 and 39 provides a certain amount of additional stability and resistance to deflection of the vertically movable knee. As shown in Fig. 3, the vertical support bars 42 and 43 are provided on their front faces with vertically extending rack teeth 45 and 46. A pair of pinions 47 and 48 of equal diameter integrally formed with a pinion shaft 50 are respectively disposed to engage the rack teeth 45 and 46 presented by the circular shafts. The central portion of the pinion shaft 50 is journalled to rotate within a horizontally disposed tubular bearing sleeve 51 contained within a horizontal bored opening in the knee. At its opposite ends, the pinion shaft 50 is provided with pilot ends of reduced diameter that are rotatably supported in antifriction bearings 54 and 55. Although the gear teeth comprising the pinions 47 and 48 are preferably formed integrally with the pinion shaft 50, it is apparent that separate pinions may be splined or keyed to the opposite ends of a similarly disposed shaft. Irrespective of whether the knee is in its lowermost position as shown in Fig. 1, or elevated to its extreme upper limit of movement as shown in Fig. 2, the operative interconnection between the rotatable pinion shaft 50 journalled in the knee 14 and the vertically disposed circular support shafts 42 and 43 tends to resist torsional deflection of the knee and work supports. In explanation, a downward force exerted upon the left end of the worktable 21 tends to urge the left pinion 47 to rotate in a forward or clockwise direction as viewed in Figs. 1 and 2. At the same time, the downward force upon the left end of the worktable 21 causes an upward movement of the right end of the worktable. Consequently, upward movement of the right end of the worktable 21 tends to rotate the right pinion 48 in a rearward or counterclockwise direction due to its coaction with the stationary rack teeth 46. Since both pinions 47 and 48 are integrally formed with the shaft 50 and the upper and downward forces are in opposition, neither pinion will actually rotate during the described condition. It will be noted that the pinion shaft 50 has been designed and proportioned to resist any torsional deflection irrespective of the magnitude of the downward force upon the worktable.

The described condition exists in the event an unbalanced load condition imposing a downward force on either end of the worktable is created while the knee 14 is retained in a stationary position of vertical adjustment. However, this same relationship between the pinion shaft and the upstanding circular bars 42 and 43 would likewise occur during upward or downward movement of the knee 14. In either case, the pinion shaft 50 operates to resist or completely eliminate any deflection of the knee and work support. It will be apparent that unbalanced load conditions may also occur during cutting operations. The forces arising from the cutting operation tend to effect a torsional or twisting deflection of the knee in a manner similar to that described if a force is applied to either end of the worktable. Whenever the elevating screw 27 is rotated to effect vertical adjustment of the knee 14, the pinion shaft 50 simply rotates due to its engagement with the rack teeth 45 and 46 in a direction corresponding to the direction of knee movement.

During certain conditions of operation, it is advantageous to rigidly clamp the knee 14 in a selected position of vertical adjustment. To accomplish this, there is provided a self-equalizing clamping mechanism operative to clamp the knee at four spaced points in a manner to rigidly secure the knee and completely obviate torsional deflection of the knee 14 or the work supports. As shown in Fig. 3, the clamping mechanism comprises four axially movable clamp elements 58, 59, 60 and 61. For retaining the front clamp element 58 in normally disengaged position relative to the vertical circular bar 42, a rod 63 secured thereto is fastened at its opposite end to a piston 64 slidable within a cylinder 65 and being resiliently biased in a rightward direction by means of spring 66. In a similar manner, the movable clamp element 59 is retained in disengaged position by means of a connecting rod 68 secured to a piston 69 that is biased in a leftward direction within the cylinder 65 by means of a spring 70. Admission of hydraulic fluid from an inlet line 71 urges both pistons 64 and 69 outwardly in a manner to urge the clamp elements 58 and 59 into clamping engagement with the vertical bars 42 and 43 respectively.

The movable left rear clamp element 60 is provided with an angular front face disposed to be urged into clamping engagement with the column dovetail way surface 15. The clamp element 60 is slidably constrained for movement within a suitable opening formed in the rearwardly extending portion 18 secured to the knee 14. To effect clamping engagement, the clamp element 60 is connected by means of a shaft 74 that is pivotably connected to the slotted upper end of a lever arm 75 secured for pivotable movement to a bracket carried by the knee 14. The lower end of the lever arm 75 is slotted to pivotally engage a rod 76 secured to a piston 77 slidably carried within a cylinder 78 and normally urged in a rightward direction by means of a spring 79. Admission of hydraulic pressure fluid through a line 81 effects leftward movement of the piston 77 to actuate the lever arm 75 for urging the clamp element 60 into clamping engagement with the dovetailed way surface 15 of the column 12.

In a like manner, the right rear clamp element 61 is connected by means of an arm 83, via a pivotably mounted lever arm 84, to the outer end of a rod 85 that is secured at its inner end to a piston 86. The piston 86 is normally urged leftwardly within a hydraulic cylinder 87 by means of a compression spring 88. To effect clamping engagement of the right clamp element 61, pressure fluid admitted through a line 89 to the cylinder 87 urges the piston 86 in a rightward direction in opposition to the spring 88, thereby urging the clamp element 61 into engagement with the column way 16.

Pressure fluid for actuating the self-equalizing clamping mechanism is derived from a sump 91 carried within the hollow knee 14, as shown in Figs. 3 and 4. From the sump 91, hydraulic fluid is pumped via a line 92 by means of a pump 93 connected to be driven by a motor (not shown) in well known manner. From the pump, fluid under pressure continues through a pressure regulating valve 94 that is connected to transmit excess hydraulic fluid through a by-pass line to an exhaust line 95. With a control valve 97 actuated to effect clamping engagement, as shown in Fig. 4, pressure fluid continues to the valve 97 about a cannelure 96 on a movable valve spool 98, and thence through a line 99 that is connected to the pressure inlet lines 71, 81 and 89. With this condition existing, as hereinbefore described, pressure fluid moves the pistons 64, 69, 77 and 86 outwardly to urge the four clamp elements respectively therewith into clamping engagement. To retain the valve in the clamp actuating position shown in Fig. 4, the valve spool 98 is secured to an outwardly extending rod 102 provided with a detent notch engaged by a resiliently biased detent 103. To disengage the clamp mechanism, a control lever 105 pivotably mounted within the knee 14 is moved upwardly, the lever having secured thereto an upwardly extending arm disposed to engage a slotted groove 106 formed in the rod 102. Movement of the lever 105 upwardly effects inward movement of the rod 102 in a manner that a detent notch 108 is moved into engagement with the detent 103. With the detent notch 108 engaging the detent 103, the valve spool 98 is retained in a leftward position in a manner that the hydraulic line 99 is connected through an opening rightwardly of the valve spool 98 to an exhaust line 109. Likewise, pressure fluid from the pressure regulating valve 94 flows about the cannelure 96 directly to the exhaust line 95.

It will be apparent that the self-equalizing clamping mechanism provides an extremely rigid support for retaining the knee 14 in a fixed position above the base 13. Likewise, the hydraulic circuit and clamp lever 105 provide a means for quickly releasing or re-engaging the self-equalizing clamping mechanism. It will be apparent that the clamping mechanism may be interlocked with both the manually operative crank 32, Fig. 1, as well as the knee directional lever 33 in such a manner that the knee is clamped automatically whenever both the crank and the lever are in neutral disengaged positions. Although not shown, this arrangement would permit automatic disengagement of the clamping mechanism whenever either the hand crank 32 or the directional lever 33 are engaged to effect selective vertical adjustment of the knee 14.

From the foregoing explanation of the construction and operation of the preferred embodiment of the invention, it is apparent that there has been provided an improved knee deflection eliminator in combination with a self-equalizing clamping mechanism for a milling machine of the knee and column type. The mechanism for resisting deflection of the knee and associated work supports from a vertical plane is operative irrespective of whether the knee is in a stationary position above the column base, or is being moved either upwardly or downwardly relative to the base. Likewise, this mechanism is operative to resist deflection irrespective of whether the saddle and table are being moved under power, or are retained in their extreme positions of adjustment in either direction. The mechanism is completely automatic and operates to resist deflection in direct proportion to the magnitude of the deflecting forces being applied, either by the lever arm effect of the worktable in an extreme end position, or the torsional deflecting forces applied as a workpiece is advanced into cutting engagement with a cutting tool carried by the tool spindle. To provide further stability of the unit interconnected work supports when the knee is in stationary position, the effect of the knee deflecting eliminator is further implemented by engaging the four position self-equalizing clamping mechanism. The combined effect of the clamping mechanism and deflection eliminator is to provide greatly increased accuracy in a knee and column type milling machine, without detracting in any way from the operational flexibility of the machine.

While the invention has been shown and described as applied to the vertically movable knee of a milling machine, it is to be understood that it may be incorporated with equal advantage in other major, movable members of a machine tool. Although particular structures have been shown and described in considerable detail as exemplary of the manner in which the invention may be practiced, it will be apparent to those skilled in the art to which this invention relates that various modifications of the structures herein shown may be effected without departing from the spirit and scope of the invention as defined in the subjoined claims.

The principles of this invention having now been fully explained in connection with the foregoing description, I hereby claim as my invention:

1. In a milling machine, a column having a forwardly extending base, a work supporting knee slidably secured to said column for selective vertical adjustment above said base, a screw and nut elevating mechanism operatively interconnected between said knee and said base, a pair of vertical tubular bearing sleeves secured to said knee in spaced apart parallelism, a pair of circular support shafts secured at their lower ends to said column base and extending upwardly to engage said bearing sleeves, said support shafts presenting rack teeth constituting vertically extending racks, a pinion shaft horizontally journalled in said knee having pinion teeth adapted to operatively engage the racks, said pinion shaft being sufficiently rigid to maintain said pinion teeth in identical positions of angularity to resist torsional deflection of said knee, power operable means connected to actuate said elevating mechanism for effecting selective vertical adjustment of said knee, clamping means movably carried within said knee adapted to be urged into clamping engagement with said column, a pair of movable clamp elements carried within said knee in position to respectively be moved into clamping engagement with said vertical support shafts, and a hydraulic control system including a source of fluid under pressure connectable to actuate said clamping means and said clamp elements for rigidly clamping said knee in a selected position of vertical adjustment above said base.

2. In a milling machine, a column having a forwardly projecting base; a knee slidably secured to said column for selective vertical movement above said base; a screw and nut elevating mechanism connected between said base and said knee for effecting vertical movement of said knee; a plurality of support shafts disposed in parallelism and being secured at their lower ends to said base in a manner to extend upwardly into said knee, said support shafts presenting vertically extending rack teeth; a plurality of like size pinions journalled in said knee respectively disposed to engage the rack teeth; rigid connecting means operatively connected to effect simultaneous rotation of said pinions; said pinions, said rigid connecting means, and said shafts being adapted to operatively coact to resist torsional deflection of said knee irrespective of whether said knee is in stationary position or is being moved vertically in response to said elevating mechanism.

3. In a machine tool, a frame, a work supporting member carried for selective vertical movement relative to said frame, a single elevating mechanism operatively interconnected between said member and said frame, said elevating mechanism being selectively operable to effect vertical rectilinear movement of said member, a pair of racks secured at their lower ends to said frame and extending upwardly in spaced apart parallelism with the rectilinear path of movement effected by said elevating mechanism, a horizontally disposed shaft journalled in said knee, and a pair of pinions fixedly secured to said shaft in a manner to respectively engage said racks whereby torsional deflection is minimized.

4. In a milling machine, a column having a forwardly extending base; a knee slidably secured to said column for selective vertical movement above said base; an elevating mechanism connected between said base and said knee for effecting vertical movement of said knee; a plurality of rack bars disposed in parallelism and being secured at their lower ends to said base in a manner to extend upwardly into said knee, a plurality of like size pinions journalled in said knee respectively disposed to engage said rack bars; rigid connecting means operatively connected to effect simultaneous rotation of said pinions; said pinions, said rigid connecting means, and said shafts being adapted to operatively coact to resist torsional deflection of said knee irrespective of whether said knee is in stationary position or is being moved vertically in response to said elevating mechanism; clamping means movably carried by said knee for selective movement into clamping engagement with said column; a plurality of clamp elements movably carried by said knee respectively disposed to be moved into clamping engagement with said rack bars; and a hydraulic control system including a source of fluid under pressure actuatable to effect clamping engagement of said clamping means and said clamp elements.

5. In a machine tool, a deflection eliminator comprising a pair of members disposed to be relatively movable in a rectilinear plane, a single selectively extensible translating mechanism operatively connected to effect relative rectilinear movement between said members, a pair of racks respectively secured at one end to the same one of said members and extending in spaced apart parallelism to the path of movement effected by said translating mechanism, and a common pinion journalled in the other of said members disposed to simultaneously engage said racks whereby said racks and said pinion operatively coact to resist relative torsional deflection between said members.

6. In a milling machine, a vertically upstanding column presenting spaced apart front way surfaces and provided with a forwardly extending base, a knee slidably secured to the column way surfaces for movement above said base, a selectively operable elevating mechanism interconnected between said base and said knee, a pair of spaced apart vertically disposed sleeve bearings secured to said knee, a pair of support bars secured at their lower ends to said column base and extending upwardly to slidably engage said sleeve bearings, said support bars presenting vertically disposed rack teeth, a pinion journalled in said knee connected to operatively engage the rack teeth presented by said support bars, a pair of rear clamp elements movably carried by said knee in a position to be moved into clamping engagement with said column, a pair of clamp elements movably carried by said knee in a position to operatively engage said vertical support bars, and a hydraulic control circuit including a source of fluid under pressure connectable to effect a simultaneous equalized engagement of said clamp elements with said column and said vertical support bars.

7. In a milling machine, a column having a forwardly extending base, a work supporting knee slidably secured to said column for selective vertical adjustment above said base, a single screw and nut elevating mechanism operatively interconnected between said knee and said base, a pair of vertical tubular bearing sleeves secured to said knee in spaced apart parallelism, a pair of circular support shafts secured at their lower ends to said column base and extending upwardly to slidably engage said bearing sleeves, said support shafts presenting vertically extending rack teeth, a pinion shaft horizontally journalled in said knee having pinion teeth integrally formed thereon in position to operatively engage the rack teeth respectively presented by said support shafts, said pinion shaft being sufficiently rigid to maintain said pinions in identical positions of angularity to resist torsional deflection of said knee, and power operable means connected to actuate said elevating mechanism for effecting selective vertical adjustment of said knee.

8. In a machine tool, a base, a work support member carried for movement relative to said base, a single selectively extensible translating mechanism operatively interconnected between said base and said work support, a pair of rack bars respectively being fixedly secured at one end to said base, said rack bars being disposed in spaced apart parallel relationship to the axis of movement of said translating mechanism, a pair of pinions journalled in said work support about an axis perpendicular to the plane of work support movement in a manner to respectively engage said rack bars, and means interconnecting said pinions for simultaneous rotation.

References Cited in the file of this patent

UNITED STATES PATENTS

| | | |
|---|---|---|
| 934,088 | Morton | Sept. 14, 1909 |
| 1,288,978 | Parsons | Dec. 24, 1918 |
| 1,371,772 | Blood | Mar. 15, 1921 |
| 1,609,459 | Burnham | Dec. 7, 1926 |
| 1,847,446 | Robinson | Mar. 1, 1932 |